April 26, 1960     B. W. FOSTER     2,933,884
TWO-STAGE GAS TURBINE AND CENTRIFUGAL COMPRESSOR
COMPOUNDED WITH A COMPRESSED GAS GENERATOR
Filed Sept. 10, 1958     2 Sheets-Sheet 1

INVENTOR.
BERRY W. FOSTER
BY
ATTORNEY

INVENTOR.
BERRY W. FOSTER

ATTORNEY

2,933,884

TWO-STAGE GAS TURBINE AND CENTRIFUGAL COMPRESSOR COMPOUNDED WITH A COMPRESSED GAS GENERATOR

Berry W. Foster, Santa Monica, Calif.

Application September 10, 1958, Serial No. 760,189

8 Claims. (Cl. 60—13)

This invention relates to a two-stage gas-turbine and a centrifugal compressor, preferably compounded with a free-piston compressed-gas generator. The first stage of the gas turbine is a centripetal gas turbine powered by high-pressure and high-temperature gases that are separated from the free-piston-engine cylinder during the compression stroke. The second stage of the gas turbine is an axial-flow impulse turbine powered by the exhaust gases from both the first-stage turbine and the free-piston engine, and also by engine-cooling bypass air from the centrifugal compressor.

The combination of this invention can accommodate a high pressure ratio across the gas turbines. The centripetal turbine may be efficient with pressure ratio drops up to 7 to 1, and the axial-flow impulse turbine may be efficient with pressure ratio drops up to 3 to 1; so the over-all pressure drop of the two turbines may be as high as 21 to 1.

The temperature of the hot gases entering the centripetal turbine may be fairly high, because the centrifugal compressor, which is an integral part of the combination, conducts away some of the heat of the rotor wheel so that the average working temperature for the first stage rotor is low enough to give the rotor a good stress life.

The high temperatures and pressures of this power plant give an efficient power plant with a high specific power output.

Other objects and advantages of the invention will appear from the following description of a preferred specific embodiment thereof, given by way of example only.

Figure 3:
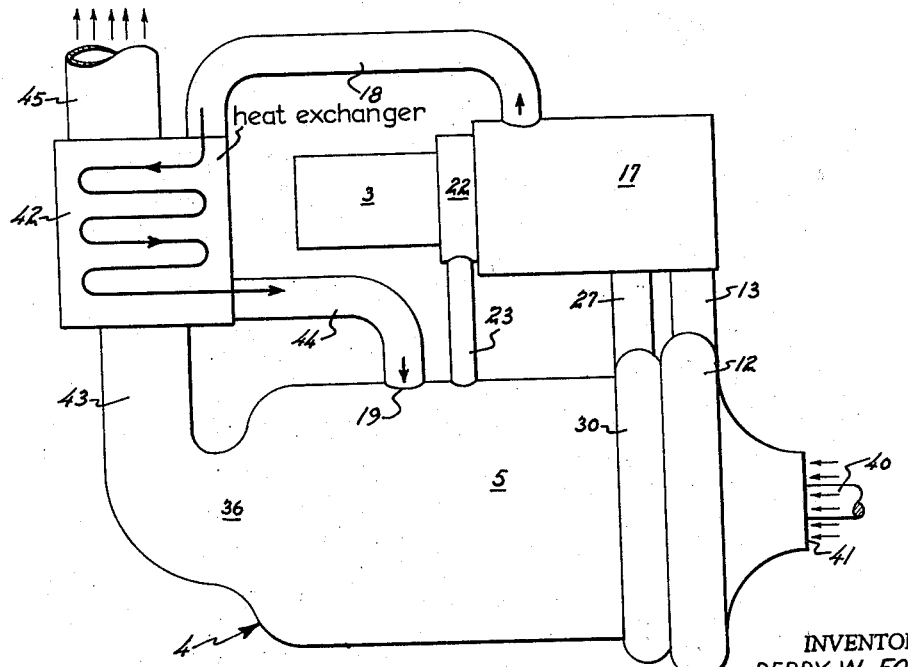

Fig. 3 is a view in side elevation and partly diagrammatic, of a free-piston compressed-gas generator compounded with a two-stage gas turbine, a centrifugal compressor, and a heat exchanger. It is identical with the pressor, and a heat exchanger. It is identical with the power plant of Fig. 1 except for the heat exchanger and the change in flow path for the cooling air.

A free-piston compressed-gas generator 3 of any type may be used as an element in the novel combination of this invention. More particularly, the type of free-piston compressed gas generator described in Patent No. 2,807,136 and in my co-pending patent applications Serial No. 705,469, filed December 24, 1957; Serial No. 745,643, filed June 30, 1958; and Serial No. 752,032, filed July 30, 1958, are well adapted to this installation. Although only one single-acting free-piston gas generator is shown, several free-piston gas generators may be arranged around or adjacent one centripetal gas turbine, and double-acting free-piston gas generators may be used if this is desired.

With this generator 3, I combine a novel unit 4 having two turbines and one compressor in a single housing 5.

The centrifugal compressor and centripetal turbine use an integral, common, impeller wheel 6 with the compressor and the turbine back to back. Centrifugal-compressor impeller vanes 7 are rigidly fastened to one side 8 of the wheel 6, and centripetal-turbine rotor vanes 9 are rigidly fastened to the other side 10 of the wheel 6. The mass flow of air through the compressor impeller vanes 7 may be as high as 8 times the mass flow of gas through the centripetal turbine rotor vanes 9. By this unique arrangement the inlet gas temperature to the turbine rotor 6 may be 2000° F., and the average temperature of the rotor 6 can be kept below 1500° F., which is within the working limits of high alloy steels.

Located circumferentially around the compressor impeller vanes 7 are diffuser or inducer vanes 11, which convert the high velocity head from the compressor rotor discharge into a pressure head. The discharge from the inducer vanes 11 is directed into a hollow annulus 12, which surrounds the compressor 8. The compressed air from the annulus 12 flows into a manifold channel 13. A part of the compressed air from channel 13 flows via a conduit 14 and intake port 15 into the engine cylinder 16 of the gas generator 3, as supercharged intake air. The balance of the compressed air from the channel 13 is used to aircool the free-piston engine 3 and the centripetal gas turbine 10. To do this, the air passes from the manifold channel 13 through a helical housing 17 that surrounds the engine cylinder 16 and then via a conduit 18 and inlet port 19 back into the housing 5.

Inside the cylinder 16, a piston 20 compresses gas which, as explained in Patent 2,807,136, is divided into separate portions. One portion is burned in the cylinder 16 in contact with the piston 20 and drives the piston 20. The burnt engine-cylinder gases exhaust through engine exhaust sleeve ports 21 and annular chamber 22 into an exhaust pipe 23, which directs them through a port 24 into a mixed gas accumulator 25, which is defined by the space in the housing 5 between the two turbines. As stated earlier, the compressor bypass cooling air from the helical channel 17 is directed into the accumulator 25, where it helps cool the centripetal turbine.

The high-pressure compressed gas that is separated from the engine cylinder 16, as explained in Patent No. 2,807,136, by a separating valve 26 is heated in a combustion chamber 27 and then expanded into an annular chamber 30 for the centripetal turbine. The hot gases in the chamber 30 expand through nozzles 31 and are directed into the gas-turbine rotor vanes 9. There the hot gases flow radially inwardly across the vanes 9 and are exhausted at the inner ports 32 into the mixed gas accumulator 25.

The housing 5 contains the mixed gases in the accumulator 25 at a pressure slightly less than the discharge pressure of the centrifugal compressor. The mixed compressed gases in the accumulator 25 are then expanded through nozzles 33 into axial-flow impulse turbine buckets 34, which are anchored to a turbine rotor 35. After passing through the turbine 35, the gases leave through outlet 36.

A common shaft 40 connects the turbine rotor 35 with the rotor 6. The torque produced by the hot gases expanding through the gas turbine elements 10 and 34 is used to drive the compressor 8, and the excess gas energy at the outlet 36 may be used to give jet thrust, or this gas energy may be completely used in the gas turbines 10 and 34 to drive the shaft 40.

The turbine rotor 35 may be free-running to give shaft power at variable speeds.

Atmospheric air enters the centrifugal compressor impeller vanes 7 at inlets 41, is pumped radially outwardly by the vanes 7, leaves the impeller blades 7 at the combined tip velocity of the blade 7 and the radial air velocity. This high velocity air is expanded through the diffusers 11 into the annular chamber 12, where its velocity head is converted to a pressure head. The overall compressor pressure ratio from the inlet 41 to the chamber 12 may vary from 1.25 to 4 atmospheres, depending upon the particular design.

This compressor air is then directed into the manifold channel 13, whence part of it is used to internally cool, scavenge, and supercharge the engine cylinder 16. The balance of the compressed air from the manifold 13 is used to externally air-cool the piston engine 3 and the gas turbine parts.

The part of gas that is separated from the engine cylinder 16 during the compression stroke is heated in the combustion chamber 27 and the heated gas flows into the turbine ring 30 and expands through the nozzles 31 into turbine rotor vanes 9. The pressure of the gases in the combustion chamber 27 may vary from 6 to 40 atmospheres, depending upon the engine design. The exhaust from the centripetal turbine 9, the exhaust from the engine cylinder 16, and the bypass cooling air in the conduit 18 discharge into the joint mixed gas accumulator 25. The pressure in the accumulator 25 is kept at slightly less than the supercharger discharge pressure; so the air flows through the engine intake, etc. This back pressure in the accumulator 25 may vary from 1.25 to 4 atmospheres. With this back pressure at the exhaust of the centripetal turbine 10 the pressure ratio drop across it may vary from 1.25 to 10 atmospheres; if the pressure ratio drop across the centripetal turbine 10 is kept at 7 to 1 or less it will be fairly efficient.

Since the mass flow of air through the centrifugal compressor 8 is several times the mass flow of the hot gases through the turbine 10 (this ratio may vary from 1.5 to 8), the compressed air has a greater capacity to carry away heat than the hot turbine gases have to give heat to the turbine 10. For example, if the compressor air-to-gas turbine mass ratio is 5 to 1 and the average temperature of the turbine gases in the blades 9 is to 2000° F., the temperature of the rotor 6 can be kept at 1500° F. by having a 100° F. temperature rise in the compressor air. By this unique arrangement the temperature of the rotor 6 can be kept within the working limits of high alloy steels.

The compressed gases in the accumulator 25 are expanded through the nozzles 33 and directed into the axial flow blades 34. The temperature of the mixed gases in the accumulator 25 should be less than 1200° F.; consequently the blades 34 and the rotor 35 will not have high temperature and can be made out of steels with low alloy content. With a pressure ratio of 3 to 1 or less across the impulse turbine blades 34, it is efficient. More power may be produced at the expense of efficiency by heating the gases in the accumulator 25 before they expand through the turbine blades 34.

*The use of heat regeneration, Fig. 3*

Figure 1:
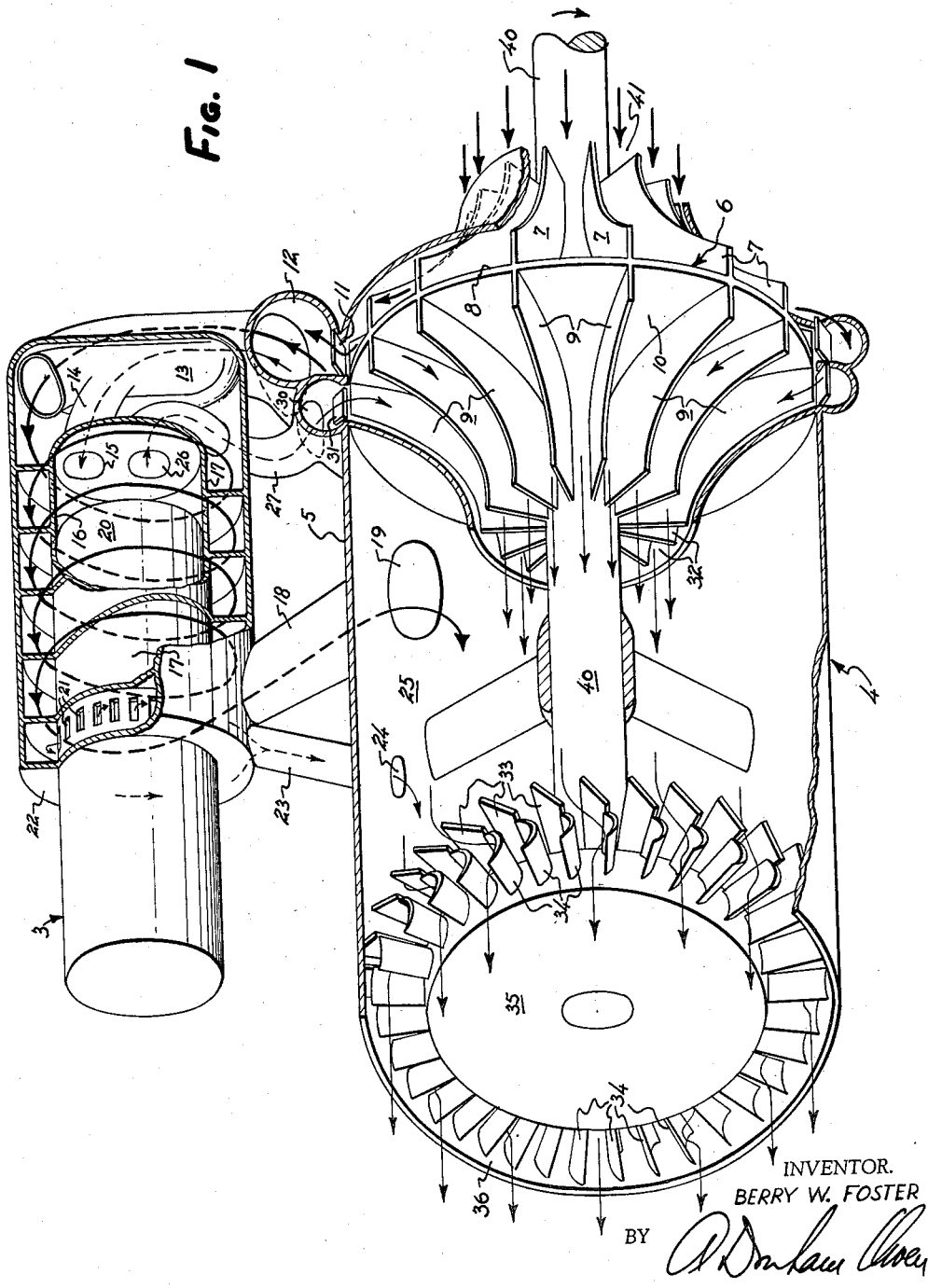
Fig. 1 is a fragmentary perspective view, partly broken away and in section, of a free-piston compressed-gas generator compounded with a two-stage gas turbine and a centrifugal compressor, according to the principles of this invention.
Figure 2:
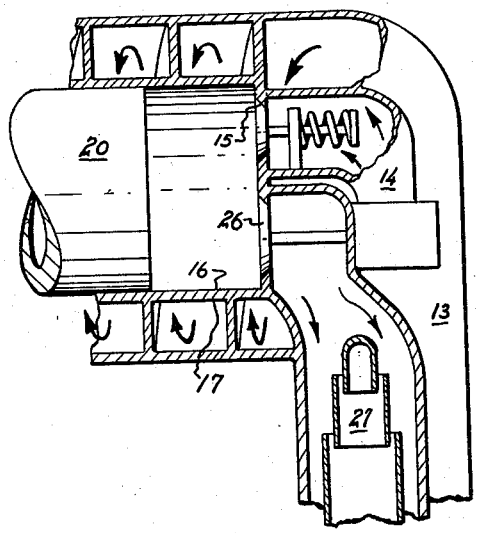
Fig. 2 is a fragmentary view in section of a portion of the compressed-gas generator.

The power plant illustrated in Fig. 3 is identical with the power plant shown in Fig. 1, except for the addition of a heat exchanger 42 and the change in flow path of the cooling air from conduit 18. The turbine exhaust 36 is provided with a ducting 43, which will direct the hot turbine exhaust gases to flow through the heat exchanger 42 and give some of their heat energy to the cooling air from conduit 18, before the turbine gases are exhausted to the atmosphere at port 45.

The engine cooling air from the helical housing 17 flows through conduit 18 to heat exchanger 42, where it is heated by a regenerative process and absorbs part of the turbine exhaust gas heat. After being heated in the heat exchanger 42, the cooling air from conduit 18 flows through conduit 44 to port 19 into accumulator 25; it is mixed with the piston engine exhaust gas and the centripetal turbine exhaust gas in accumulator 25. The mixed compressed gases in accumulator 25 are reheated by internal combustion and then expanded through the nozzles 33 and directed into the axial flow turbine blades 34, all as explained previously. The exhaust gases from turbine 34 flow through the heat exchanger 42 and then exhaust to the atmosphere through port 45.

With the high pressure ratios and high combustion temperature for the gas turbine designed so that they will be within the practical limits, the specific power of this power plant may be made fairly high. It may produce better than 5 horsepower per pound of engine weight, when several double acting free piston gas generators are used with one compressor and turbine rotor unit. The high combustion temperature of the gases in the piston engine, and the regenerative heating during the cooling of the power plant parts makes this compounded power plant fairly efficient. Theoretically this power plant may have a specific fuel consumption of .30 pound of fuel per horsepower hour.

For power plants in the 10 to 1000 horsepower range, where weight and simplicity of mechanical parts is an important requirement, this free piston engine compounded with two gas turbines has special usefulness. Several gas generators may be connected to a single housing-rotor combination, if desired.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. An engine combination, including in combination a compressed-gas generator having a cylinder, a piston, air-intake means, means for separating the air compressed in said cylinder by said piston into two portions, means for exploding one said portion in said cylinder, first exhaust means for said one portion, means for isolating the other said portion from said cylinder, means for separately exploding said other portion, and second exhaust means for said other portion; a cooling chamber surrounding said cylinder and having an inlet and an outlet; a housing; a shaft rotatable in said housing; first and second rotors mounted on said shaft, said first rotor having first radially extending blades on the side away from said second rotor and second radially extending blades on the side facing said second rotor, said first rotor having an air inlet near said shaft, a plurality of diffuser blades around the outer periphery of said first blades, means defining a first annular chamber around said diffuser blades, a manifold connecting said first annular chamber to said air-intake means, and to said inlet for said cooling chamber, means defining a second annular chamber around said second blades, nozzle means in said second chamber adjacent the outer periphery of said blades, and first conduit means connecting said nozzles to said second exhaust means; said second rotor being spaced from said first rotor to provide an accumulator chamber in said housing between said rotors, said second rotor having axial-flow turbine blades thereon; second conduit means connecting said first exhaust means to said accumulator chamber; and third conduit means connecting said outlet of said cooling chamber to said accumulator chamber.

2. The combination of claim 1 wherein said housing has an exhaust tube for the gases expelled by said second rotor, said third conduit means encircling said exhaust tube in heat-exchange relation therewith.

3. The combination of claim 1 wherein said cooling chamber is helical.

4. The combination of claim 1 wherein there are cooling fins for said cylinder extending into said cooling chamber.

5. An engine combination, including in combination at least one compressed-gas generator, each said generator having a cylinder, a piston, air-intake means, means for separating the air compressed in said cylinder by said piston into two portions, means for exploding one said portion in said cylinder, first exhaust means for said one portion, means for isolating the other said portion from said cylinder, means for separately exploding said other portion, and second exhaust means for said other portion; a cooling chamber surrounding said cylinder and having an inlet and an outlet; a housing; first and second rotors in said housing, said first rotor having a centrifugal compressor on the side away from said second rotor and a centripetal turbine on the side facing said second rotor, an inlet to said centrifugal compressor near said shaft, a manifold leading from the periphery of said centrifugal compressor to said air-intake means and to said inlet of said cooling chamber; first conduit means connecting said second exhaust means to said centripetal turbine; said second rotor being an axial-flow turbine and spaced from said first rotor to provide an accumulator chamber in said housing between said rotors; second conduit means connecting said first exhaust means to said accumulator chamber, and third conduit means connecting the outlet from said cooling chamber to said accumulator chamber.

6. The combination of claim 5 wherein said first and second rotors are mounted on a common shaft.

7. The combination of claim 5 wherein said second rotor is a free-running axial-flow gas turbine, to deliver shaft power at variable speeds.

8. The combination of claim 5 wherein there are several gas generators for each housing-rotor combination.

References Cited in the file of this patent

FOREIGN PATENTS

| 894,398 | France | Mar. 13, 1944 |
| 699,846 | Great Britain | Nov. 18, 1953 |
| 755,945 | Great Britain | Aug. 29, 1956 |